United States Patent [19]
Wild et al.

[11] 3,846,498
[45] Nov. 5, 1974

[54] PROCESS FOR PREPARATION OF 3,5-BIS (3,3-DIMETHALLYL)-2,4,6-TRIHYDROXY-PHENONES

[75] Inventors: Jost Wild, Zurich; Trudi Sigg-Grutter, Wintherthur, both of Switzerland

[73] Assignee: Givaudan Corporation, Clifton, N.J.

[22] Filed: July 12, 1973

[21] Appl. No.: 378,477

[30] Foreign Application Priority Data
July 20, 1972  Switzerland...................... 10870/72

[52] U.S. Cl. .............................................. 260/592
[51] Int. Cl. ............................................ C07c 49/82

[58] Field of Search .................................... 260/592

[56] References Cited
FOREIGN PATENTS OR APPLICATIONS
899,198   12/1953   Germany ........................... 260/592

*Primary Examiner*—Daniel D. Horwitz
*Attorney, Agent, or Firm*—Thomas Cifelli, Jr.

[57] ABSTRACT

An economically interesting process for preparing 3,5-bis (3,3-dimethallyl)-2,4,6-trihydroxy phenones, useful as flavorants and as intermediates for other flavorants, such as isohumolone.

13 Claims, No Drawings

PROCESS FOR PREPARATION OF 3,5-BIS (3,3-DIMETHALLYL)-2,4,6-TRIHYDROXY-PHENONES

FIELD OF THE INVENTION

This invention relates to the field of flavorants.

SUMMARY OF THE INVENTION

The present invention relates to a process for the manufacture of bitter substances.

The bitter substances obtained according to the present invention are compounds of the general formula

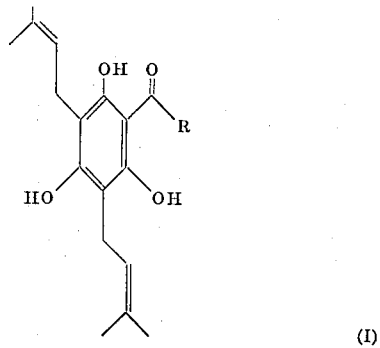

(I)

wherein R represents a $C_1$-$C_5$ alkyl group.

According to the present invention, the compounds of formula I hereinbefore are manufactured by prenylating a compound of the general formula

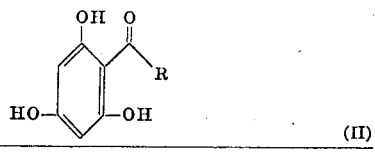

(II)

, wherein R has the significance given earlier, under alkaline conditions in the presence of magnesium oxide and an iodide.

The compounds of formula I are useful as intermediates which can be converted by oxidation into compounds of the general formula

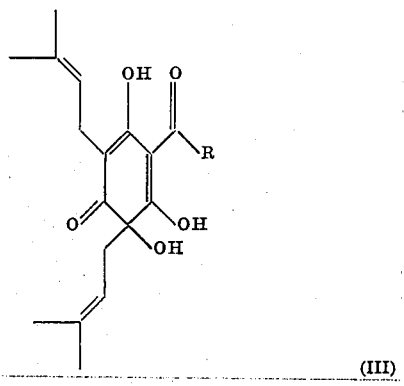

(III)

, wherein R has the significance given earlier, [Riedl, Chem. Ber. 85, 692-710 (1952)]. The compounds of the formula III are precursors of the known bitter substances of the general formula

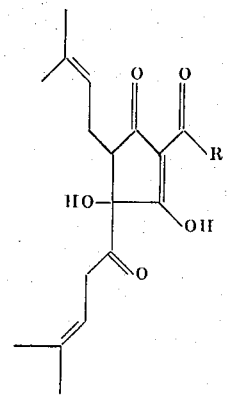

(IV)

wherein R has the significance given earlier.

The compounds of formula IV can be obtained from the compounds of formula III by isomerisation.

The compounds of formula IV are of significance in the beverage industry (e.g., in beer-brewing). Thus, for example, in the brewing of beer humulone (formula III, R = isobutyl), which is present in hops, is converted into isohumulone formula IV, R = isobutyl) during the boiling of the wort with hops, whereby the agreeable bitter taste is conferred to the beer.

The present process enables the compounds of formula I to be manufactured for the first time in good yields. It accordingly provides an economically interesting route to compounds of formula III or IV which has hitherto not been possible (Riedl., loc. cit.).

DESCRIPTION OF THE PREFERRED EMBODIMENTS

The prenylation is expediently carried out using prenyl chloride or prenyl bromide (1-chloro-or 1-bromo-3-methyl-2-butene).

The stoichiometric proportion of prenyl chloride or prenyl bromide to compound of formula II amounts to 2:1, but the prenylation agent can also be used in excess (e.g. in the molar proportion of 4:1).

The prenylation is advantageously carried out in an inert gas atmosphere (e.g. under nitrogen or argon).

The amount of magnesium oxide used in the present process should amount to at least 0.5 mol equivalents based on the prenyl chloride or prenyl bromide used in order to guarantee the alkalinity of the reaction medium. Larger amounts of magnesium oxide do not, however, give rise to disadvantages.

An alkali metal iodide such as lithium iodide, sodium iodide or potassium iodide is preferably used as the iodide. However, other inorganic iodides (e.g., alkaline earth metal iodides such as magnesium iodide) or organic iodides (e.g., tetraalkylammonium iodides such as tetrabutylammonium iodide) can also be used. Although the amount of iodide used is not critical, a minimum amount of approximately 1 percent of the amount of the compound of formula II is, however, conveniently used.

Especially suitable solvents are ketones (e.g. acetone, methyl ethyl ketone and cyclohexanone) if necessary with small additions (e.g., 1 percent) of water, alcohols, etc, and aromatic hydrocarbons (e.g., benzene or benzene in admixture with one of the solvents mentioned earlier).

The prenylation is preferably carried out at room temperature or slightly above room temperature (e.g.

at about 35°C. However, it can be carried out at higher temperatures (e.g., up to the boiling point of the solvent used). In this case, the yield of the desired compounds of formula I can decrease because of the formation of undesired byproducts.

The prenylation time can vary from a few minutes up to 20 hours. It is dependent on the temperature and the solvent used.

The isolation of the compounds of formula I from the prenylation mixture can be carried out according to methods known per se; for example, by dilution of the mixture with water followed by extraction with a non-polar solvent such as an aliphatic hydrocarbon (e.g., hexane, pentane, etc). Polar solvents such as, for example, ether or ethyl acetate can also be used, but these generally lead to impure products.

The following Examples illustate the present invention:

EXAMPLE 1

8.4 g of phloroacetophenone are dissolved in 100 ml of acetone and treated with 4.4 g of magnesium oxide, 8.3 g of potassium iodide and 20.9 g of 1-chloro-3-methyl-2-butene. The mixture is maintained at reflux under nitrogen for 16 hours. After cooling to room temperature, 200 ml of water are added and the mixture is extracted three times with 1 litre of hexane each time. Thereafter, the organic phases are washed three times with 250 ml of water each time, dried over sodium sulphate and concentrated under reduced pressure at 40°C. There are obtained 8.5 g of 3,5-bis(3-methyl-2-butenyl)-phloroacetophenone which is recrystallised from hexane, 6.13 g of pure product of melting point 78° – 79°C being obtained.

EXAMPLE 2

9.8 g of phloroisobutyrophenone are dissolved in 100 ml of acetone and treated with 4.4 g of magnesium oxide, 8.3 g of potassium iodide and 20.9 g of 1-chloro-3-methyl-2-butene. The mixture is maintained at reflux under nitrogen for 16 hours. After cooling to room temperature, 200 ml of water are added and the mixture is extracted three times with 1 litre of hexane each time. The organic phases are then washed three times with 250 ml of water each time, dried over sodium sulphate and concentrated under reduced pressure at 40°C. There are obtained 12.05 g of 3,5-bis(3-methyl-2-butenyl)-phloroisobutyrophenone which are recrystallised from hexane to yield 7.25 g of pure material of melting point 78° – 79°C.

EXAMPLE 3

1.05 g of phloroisovalerophenone are dissolved in 10 ml of acetone and treated with 1 g of magnesium oxide, 400 mg of potassium iodide and 1.56 g of 1-chloro-3-methyl-2-butene. The mixture is maintained at reflux under argon for 11 hours. After cooling to room temperature, 25 ml of water are added and the mixture is extracted three times with 100 ml of hexane each time. The organic phases are washed three times with 25 ml of water each time, dried over sodium sulphate and concentrated under reduced pressure at 40°C. There are obtained 1.15 g of a crude product. By recrystallisation from hexane, there are obtained 695 mg of pure 3,5-bis(3-methyl-2-butenyl)-phloroisovalerophenone of melting point 81° – 82°C.

EXAMPLE 4

2.1 g of 2',4',6'-trihydroxy-2-methylbutryophenone are dissolved in 20 ml of acetone and treated with 1.5 g of magnesium oxide, 830 mg of potassium iodide and 4.18 g of 1-chloro-3-methyl-2-butene. The mixture is maintained at reflux under nitrogen for 15 hours. After cooling to room temperature, 50 ml of water are added and the mixture is extracted three times with 200 ml of hexane each time. The organic phases are washed three times with 50 ml of water each time, dried over sodium sulphate and concentrated at 40°C under reduced pressure. There are obtained 1.87 g of 2',4',6'-trihydroxy-2-methyl-3',5'-bis(3-methyl-2-butenyl)-butyrophenone as a viscous oil, the spectroscopic properties (IR, UV, NMR, MS) of which agree with the stated structure.

What we claim is:

1. A process for the manufacture of compounds of the formula

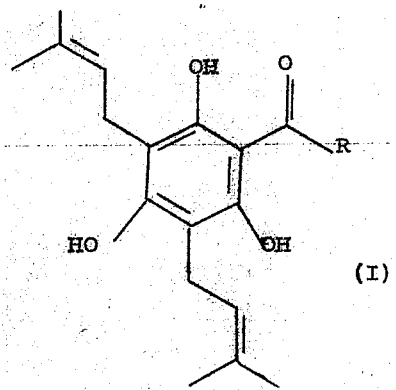

wherein R represents a $C_{1-5}$ alkyl group, which process comprises reacting in an inert solvent a compound of the formula

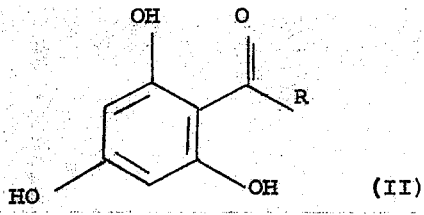

wherein R has the significance given earlier in this claim, with prenyl bromide or prenyl chloride in a mole ratio of at least 2 of the latter to 1 of II under alkaline conditions in the presence of at least 0.5 equivalent of magnesium oxide based on the prenyl bromide or prenyl chloride and in the presence of at least 1 percent of the amount of compound II of an alkali metal iodide, an alkaline earth metal iodide or a tetraalkylammonium iodide.

2. A process according to claim 1, wherein an alkali metal iodide is used as the iodide.

3. A process according to claim 1, wherein 1-chloro or 1-bromo-3-methyl-2-butene is used as the prenylating agent.

4. A process according to claim 2, wherein 1-chloro or 1-bromo-3-methyl-2-butene is used as the prenylating agent.

5. A process according to claim 1, wherein a compound of formula II in which R represents the methyl group is used as the starting material.

6. A process according to claim 1, wherein a compound of formula I' in which R represents the isopropyl group is used as the starting material.

7. A process according to claim 1, wherein a compound of formula II in which R represents the isobutyl group is used as the starting material.

8. A process according to claim 1, wherein a compound of formula I in which R represents the secbutyl group is used as the starting material.

9. A process according to claim 4, wherein the reaction is conducted in the presence of acetone at reflux under nitrogen.

10. A process according to claim 9, wherein R is a methyl group.

11. A process according to claim 9, wherein R is an isopropyl group.

12. A process according to claim 9, wherein R is an isobutyl group.

13. A process according to claim 9, wherein R is a sec-butyl group.

* * * * *